(12) United States Patent
Trinchet

(10) Patent No.: US 9,840,196 B1
(45) Date of Patent: Dec. 12, 2017

(54) AIRPORT TERMINAL COURTESY CAR INDICATOR SYSTEM USING SPEAKERS FOR PROVIDING INSTRUCTIONS

(71) Applicant: Hirio M Vera Trinchet, Miami, FL (US)

(72) Inventor: Hirio M Vera Trinchet, Miami, FL (US)

( * ) Notice: Subject to any disclaimer, the term of this patent is extended or adjusted under 35 U.S.C. 154(b) by 48 days.

(21) Appl. No.: 15/177,328

(22) Filed: Jun. 8, 2016

(51) Int. Cl.
*G08B 21/00* (2006.01)
*B60Q 5/00* (2006.01)

(52) U.S. Cl.
CPC .................................. *B60Q 5/001* (2013.01)

(58) Field of Classification Search
CPC ....................................................... B60Q 5/001
USPC ............................. 340/425.5, 465, 468, 464
See application file for complete search history.

(56) References Cited

U.S. PATENT DOCUMENTS

2014/0056438 A1* 2/2014 Baalu ..................... B60Q 5/008
381/86

* cited by examiner

*Primary Examiner* — Jeffrey Hofsass
(74) *Attorney, Agent, or Firm* — Ruben Alcoba, Esq.

(57) ABSTRACT

An airport terminal courtesy car indicator system that will prevent uncomfortable situations between operators of the courtesy cars and bystanders within an airport terminal. The courtesy car indicator comprises of an airport terminal transportation vehicle, that may be a golf cart, that is equipped with a synthesizer, an amplifier, and a speaker system that can be manually operated by an operator to give at least 4 instructions with regards to the positioning of the car within the terminal in relation any bystander within the vicinity of the courtesy car.

4 Claims, 1 Drawing Sheet

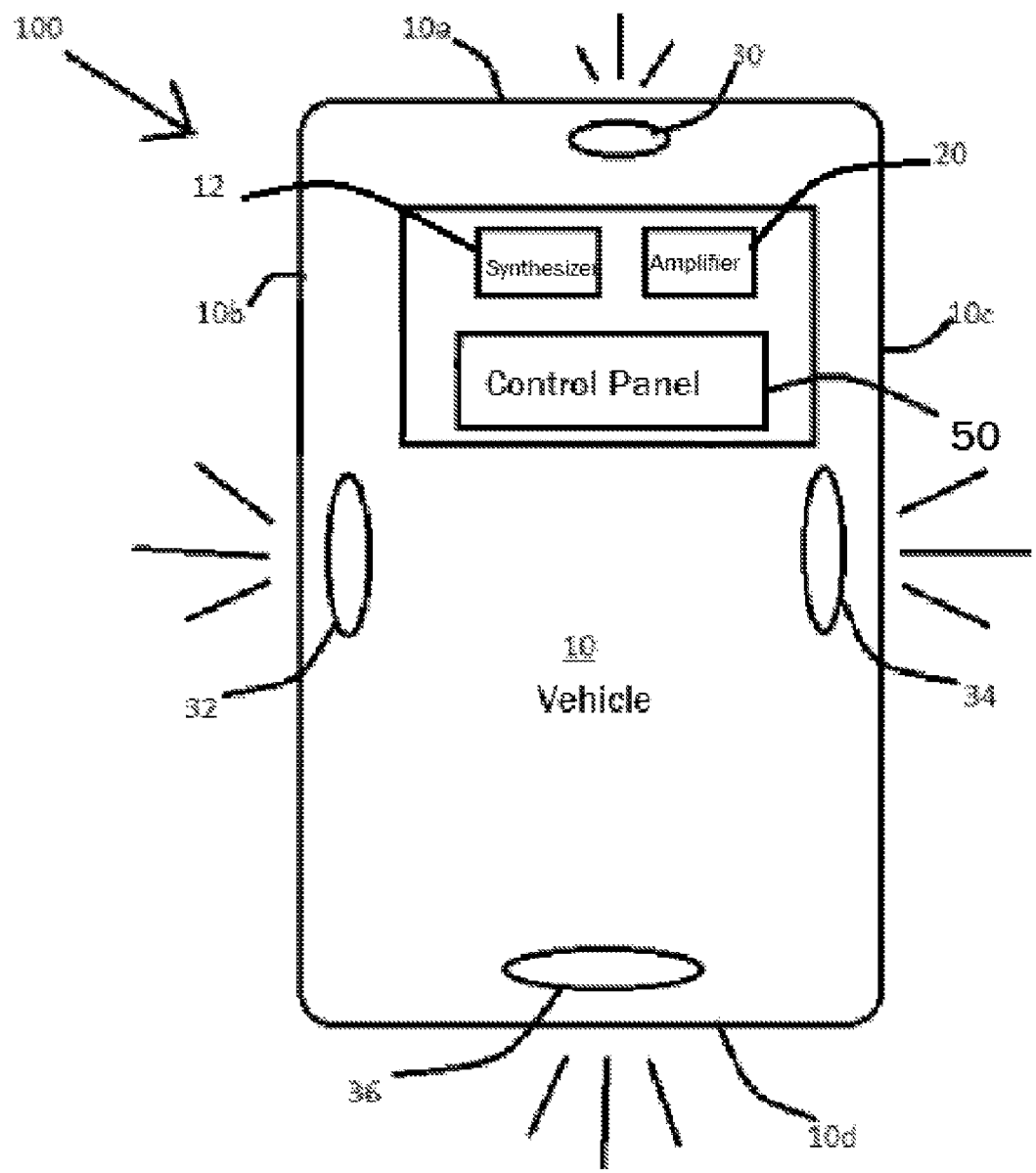

AIRPORT TERMINAL COURTESY CAR INDICATOR SYSTEM USING SPEAKERS FOR PROVIDING INSTRUCTIONS

BACKGROUND

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The present invention is directed to an airport terminal courtesy car indicator system that informs bystanders in an airport the position of the courtesy car and an instruction as to what action the bystander is suggested to take in a courteous manner.

Presently, courtesy cars roam airport airports in a very unpleasant manner. Operators of courtesy cars either scream or honk at passers in airport terminals to move out of the way of the courtesy cars. Some airlines have even gone so far as preventing operators of the courtesy cars from using their horns to instruct bystanders of the presence of the courtesy cars. The present invention aims at providing a manner in which the operator of the courtesy car can inform a bystander the presence of the car and possibly an instruction as to requested action that is to be taken by the bystander.

The inventor believes that many unpleasant situations caused by courtesy car operators in airport terminals can be avoided by providing the operators of the courtesy cars with a tool that they can simply manipulate to give a courteous mechanical instruction to bystanders.

For the foregoing reasons, there is a need for an airport terminal courtesy car indicator system that will prevent uncomfortable situations between operators of the courtesy cars and bystanders within an airport terminal.

SUMMARY

The present invention describes an airport terminal courtesy car indicator system that will prevent uncomfortable situations between operators of the courtesy cars and bystanders within an airport terminal.

The present invention comprises of an airport terminal transportation vehicle, a golf cart, that is equipped with a synthesizer, an amplifier, and a speaker system that can be manually operated by an operator to give at least 4 instructions with regards to the positioning of the car that is within the terminal in relation any bystander that is within the vicinity of the courtesy car.

The system will have a control in which at least 4 different instructions can be manipulated by the operator to be delivered to 4 specific locations in relation to the courtesy car. The delivery of the message shall be made so that if an instruction is to be delivered to the front, right, rear, or left of the car, then the instruction will have a speaker located at a position that corresponds to the instruction that is to be delivered to a bystander. In a preferred embodiment of the invention, only the speaker that corresponds to the location in which the operator chooses to relay the instruction shall play the instruction, thereby ensuring that others near the courtesy car are not alarmed by the instruction.

An object of the present invention is to provide an airport courtesy car indicator system that will have the capacity to inform bystanders of the position of the courtesy car.

Another object of the present invention is to provide an airport courtesy car indicator system that will have the capacity to inform a bystander of a request to move from the path of the courtesy car.

Yet another object of the present invention is to provide an airport courtesy car indicator system that will allow an operator of the courtesy car to politely inform a bystander the position of the courtesy car in a mechanical and courteous manner.

DRAWINGS

These and other features, aspects, and advantages of the present invention will become better understood with regard to the following description, appended claims, and drawings where:

FIG. 1 is a diagram that shows a depiction of an airport terminal courtesy car indicator system that shows 4 bystanders in the vicinity of the courtesy car, the FIGURE also shows the positioning of the speakers of the courtesy car in relation to the courtesy car.

DESCRIPTION

The present invention, referenced in FIG. 1, is directed to an airport terminal courtesy car indicator system 100 that comprises of an airport terminal transportation vehicle 10 that has a front 10*a*, a left 10*b*, a right 10*c* and a rear side 10*d*, that is equipped with a synthesizer 12, an amplifier 20, and a speaker system that comprises a front 30, a left 32, a right 34, and rear speaker 36, the amplifier 20, the synthesizer 12 and the speakers 30, 32, 34 and 36 are connected either by wire wirelessly and are operated through at control panel 50 in which each speaker will be controlled by at least one selector in the control panel that will trigger the synthesizer 12 to play a message (not shown in figures) that will be amplified by the amplifier 20 and played in the desired speaker.

The system will have a control panel 50 in which at least 4 different instructions can be manipulated by the operator to be delivered to 4 specific locations in relation to the courtesy car 100. The delivery of the message shall be made so that if an instruction is to be delivered to the front, right, rear, or left of the transportation vehicle, then the instruction will have a speaker located at a position that corresponds to the instruction that is to be delivered to a bystander. In a preferred embodiment of the invention, only the speaker 30, 32, 34 and 36 that corresponds to the location in which the operator chooses to relay the instruction shall play the instruction, thereby ensuring that others near the courtesy car 10 are not alarmed by the instruction.

In a preferred embodiment, the rear speaker and the instruction that corresponds to the rear speaker shall automatically be triggered by placing the courtesy car in reverse.

In a preferred embodiment, the instruction that will be played by the front speaker shall be PLEASE EXCUSE THE CAR. The instruction that will be played by the right speaker shall be TURNING RIGHT. The instruction that will be played by the left speaker shall be TURNING LEFT. And, the instruction that will be played by the rear speaker shall be BACKING UP.

An advantage of the present invention is that it provides an airport courtesy car that has the capacity to inform bystanders of the position of the courtesy car.

Another advantage of the present invention is that it provides an airport courtesy car that has the capacity to inform a bystander of a request to move from the path of the courtesy car.

Yet another advantage of the present invention is that it provides an airport courtesy car that allows an operator of the courtesy car to politely inform a bystander the position of the courtesy car in a mechanical and courteous manner.

While the description above contains many specificities, these should not be construed as limitations on the scope, but rather as an exemplification of several preferred embodiments thereof. Many other variations are possible. Accordingly, the scope should be determined not by the embodiments illustrated, but by the appended claims and their legal equivalents.

What is claimed is:

1. An airport terminal courtesy car indicator system, the indicator system comprises:
    an airport terminal transportation vehicle that has a front, a left, a right and a rear side
    a synthesizer and an amplifier that are mounted on the airport transportation vehicle; and
    a speaker system that comprises a front, a left, a right, and rear speaker, the amplifier, the synthesizer and the speakers are connected either by wire or wirelessly and are operated through a control panel in which each speaker will be controlled by at least one selector in the control panel that will trigger the synthesizer to play a message that will be amplified by the amplifier and played in the desired speaker.

2. The airport terminal courtesy car indicator system of claim 1, wherein the control panel has a selector that will play at least 4 different instructions.

3. The airport terminal courtesy car indicator system of claim 2, wherein the rear speaker and the instruction that corresponds to the rear speaker shall automatically be triggered by placing the courtesy car in reverse.

4. The airport terminal courtesy car indicator system of claim 3, wherein the instruction played by the speakers shall be as follows:
    the instruction that will be played by the front speaker shall be PLEASE EXCUSE THE CAR;
    the instruction that will be played by the right speaker shall be TURNING RIGHT;
    the instruction that will be played by the left speaker shall be TURNING LEFT; and
    the instruction that will be played by the rear speaker shall be BACKING UP.

\* \* \* \* \*